(12) United States Patent
Kuwabara et al.

(10) Patent No.: US 8,449,193 B2
(45) Date of Patent: May 28, 2013

(54) CRANKSHAFT BEARING FOR INTERNAL COMBUSTION ENGINE

(75) Inventors: Aisuke Kuwabara, Inuyama (JP); Takahiko Mizuno, Inuyama (JP)

(73) Assignee: Daido Metal Company, Nagoya (JP)

( * ) Notice: Subject to any disclaimer, the term of this patent is extended or adjusted under 35 U.S.C. 154(b) by 0 days.

(21) Appl. No.: 13/420,084

(22) Filed: Mar. 14, 2012

(65) Prior Publication Data

US 2012/0243815 A1  Sep. 27, 2012

(30) Foreign Application Priority Data

Mar. 25, 2011 (JP) .................................. 2011-067854

(51) Int. Cl.
F16C 17/04 (2006.01)
F16C 35/02 (2006.01)

(52) U.S. Cl.
USPC ............................. 384/420; 384/429; 384/432

(58) Field of Classification Search
USPC .................. 384/288, 294, 295, 420, 428, 429, 384/430, 432–434; 123/195 R
See application file for complete search history.

(56) References Cited

U.S. PATENT DOCUMENTS

| | | | | |
|---|---|---|---|---|
| 4,175,801 A | * | 11/1979 | Coil et al. | 384/429 |
| 5,062,718 A | * | 11/1991 | Lenhard-Backhaus et al. | 384/294 |
| 5,462,365 A | * | 10/1995 | Brandt | 384/294 |
| 5,520,466 A | * | 5/1996 | Everitt et al. | 384/294 |
| 6,471,405 B1 | * | 10/2002 | Bickle et al. | 384/294 |
| 7,134,793 B2 | * | 11/2006 | Thompson et al. | 384/294 |
| 7,258,489 B2 | * | 8/2007 | Welch et al. | 384/273 |
| 2003/0128902 A1 | * | 7/2003 | Kennedy | 384/275 |
| 2005/0135716 A1 | * | 6/2005 | Welch et al. | 384/275 |
| 2005/0223546 A1 | * | 10/2005 | Klier et al. | 29/724 |

FOREIGN PATENT DOCUMENTS

| | | |
|---|---|---|
| GB | 2134189 A | 8/1984 |
| GB | 2262576 A | 6/1993 |
| JP | 47-7011 A | 4/1972 |
| JP | 59-147115 A | 8/1984 |
| JP | 7-504017 A | 4/1995 |
| WO | 2009062904 A1 | 5/2009 |
| WO | WO 2009062904 A1 | 5/2009 |

* cited by examiner

*Primary Examiner* — Phillip A Johnson
(74) *Attorney, Agent, or Firm* — Browdy and Neimark, PLLC

(57) ABSTRACT

Disclosed is a crankshaft bearing for an internal combustion engine. At the inner periphery of the semicircular thrust bearing, two impact load receiving projections are projected besides the two tabs. Each of at least the two impact load receiving projections is between each of the two tabs and each of the circumferential end surfaces of the semicircular thrust bearing. The two impact load receiving projections are at line-symmetrical positions with each other with respect to the center line of the semicircular thrust bearing. A height of the impact load receiving projection is set at a dimension such that a top portion of the impact load receiving projection is not in contact with an outer circumferential surface of the semi-cylindrical sliding bearing in a static state in which the pair of semi-cylindrical sliding bearings is assembled into the bearing housing of the crankshaft and restrained.

6 Claims, 6 Drawing Sheets

CRANKSHAFT BEARING FOR INTERNAL COMBUSTION ENGINE

INCORPORATION BY REFERENCE

The present application claims priority from JP Patent Application Ser. No. 2011-67854 filed on Mar. 25, 2011, the content of which is hereby incorporated by reference into this application.

BACKGROUND OF THE INVENTION (1) Field of the Invention

The present invention relates to a crankshaft bearing for an internal combustion engine, and more particularly relates to a crankshaft bearing that is used with a semicircular thrust bearing attached to each of a pair of semi-cylindrical sliding bearings that is to be combined into a cylindrical shape.

(2) Description of Related Art

A crankshaft of an internal combustion engine is supported at a journal portion thereof by a lower portion of a cylinder block of the internal combustion engine via a main bearing constituted of a pair of semi-cylindrical sliding bearings. Out of the pair of semi-cylindrical sliding bearings, one or both of the semi-cylindrical sliding bearings is or are used in combination with a semicircular thrust bearing or semicircular thrust bearings. The semicircular thrust bearing is provided by being assembled to form a flange shape along one or both of two side edges of an axial end surface (that is, the side edges in a width direction) of at least one of the semi-cylindrical sliding bearings. The assembly is performed by fitting and engaging at least two tabs, which are provided at an inner periphery of the semicircular thrust bearing spaced apart from each other, in a plurality of corresponding notches (that is, recesses) which are formed at axial side edges of the semi-cylindrical sliding bearing.

The pair of semi-cylindrical sliding bearings is formed into a cylindrical shape and is held in a split type bearing housing. And, in a free state before being incorporated into the split type bearing housing, the semi-cylindrical sliding bearing is configured in a shape in which a radius of curvature becomes gradually larger from a circumferential central region thereof toward both circumferential ends. In a state (restrained state) in which the pair of semi-cylindrical sliding bearings is incorporated into a bearing holding hole of the split type bearing housing, regions of respective butted end portion of the pair of semi-cylindrical sliding bearings are in a shape pressed and deformed toward a circle center from an initial semicircular shape (shape in the free state before being incorporated into the bearing housing) so as to conform to the shape of the bearing holding hole. In other words, each of the semi-cylindrical sliding bearings fitted to each of half bodies of the split type bearing housing before assembly is held in close contact with the bearing housing half body with its own elastic restoring force which is generated by the deformation.

More specifically, in the free state, the radius of curvature of the semi-cylindrical sliding bearing differs in the circumferential central region and both circumferential end regions. And, the radius of curvature in both the circumferential end regions is larger than in the circumferential central region. When the semicircular thrust bearing is attached to the semi-cylindrical sliding bearing by using the engagement relation of the tabs and notches (recesses), one side edge of the tab interferes with one side edge of the notch of the semi-cylindrical sliding bearing in the free state, and the semicircular thrust bearing and the semi-cylindrical sliding bearing are brought into a state in which they are mechanically coupled to each other. Accordingly, the semicircular thrust bearing and the semi-cylindrical sliding bearing can be assembled into the split type bearing housing as an integrally combined single assembly. In the assembled state, the regions of the respective butted end portions of the pair of semi-cylindrical sliding bearings are deviated toward the curvature center, and the pair of semi-cylindrical sliding bearings is deformed in accordance with the shape of the bearing holding hole. However, since the semicircular thrust bearing is located outside the split type bearing housing, it is not deformed at all. Further, the interference/coupling relation of the notches and the tabs is dissolved by deformation of the semi-cylindrical sliding bearing, and the semicircular thrust bearing becomes slightly movable in the axial direction of the crankshaft with respect to the semi-cylindrical sliding bearing. As a result, at the time of operation of the internal combustion engine, automatic positioning (alignment) is performed, in which a thrust load receiving surface of the semicircular thrust bearing comes to be parallel to a side surface of crank web which applies the axial load of the crankshaft.

The combination relations of the semi-cylindrical sliding bearings and the semicircular thrust bearings are shown in patent documents, such as JP-A-47-7011, JP-A-59-147115, JP-A-07-504017, and WO 2009/062904 A1.

BRIEF SUMMARY OF THE INVENTION

As the trend of recent years, the output power of internal combustion engines is enhanced, and rigidity of the bearing housings of the crankshafts tends to be lowered in order to reduce the weights of the internal combustion engines. In association with this, the bearing housings are easily deformed elastically, and there arises the problem that at the time of operation of the internal combustion engines, the tabs of the semicircular thrust bearings and the notches of the semi-cylindrical sliding bearings repeatedly interfere with one another, and the tabs and the notches are deformed or broken.

Here, the problem of breakage of the tabs and notches will be described.

When the crankshaft revolves at a high speed in the operation of an internal combustion engine, a large repetitive fluctuating load is applied to the bearing housing. Thereby, the bearing housing with lowered rigidity elastically deforms repetitively, and the shape of the bearing holding hole of the bearing housing also changes repetitively. Thereby, the diameter of the bearing holding hole in the direction along the combined surface of the split type bearing housing (hereinafter, referred to as a horizontal direction; with respect to combination of a pair of semi-cylindrical sliding bearings, the direction along the combined surface is also referred to as the horizontal direction) repeatedly increases and decreases. With this, the shape of the pair of semi-cylindrical sliding bearings held in the bearing holding hole of the bearing housing also changes repeatedly. More specifically, when the inside diameter in the horizontal direction of the bearing holding hole increases, the outside diameter in the horizontal direction of the pair of semi-cylindrical sliding bearings increase. As a result, the tabs of the semicircular thrust bearing and the side edges of the notches of the semi-cylindrical sliding bearing collide with one another and strongly interfere with one another. By repetition of the collision and interference, deformation and breakage of the tabs and the notches occur.

Thus, an object of the present invention is to provide a crankshaft bearing for an internal combustion engine which can effectively prevent deformation and breakage of the tabs and notches of a semicircular thrust bearing and a semi-cylindrical sliding bearing which are integrally combined by an engagement relation of the tabs and the notches, in reaction to a phenomenon that during operation of the internal combustion engine, a bearing housing holding the crankshaft bearing elastically deforms repetitively, and a pair of semi-cylindrical sliding bearings which is held in the bearing housing elastically deforms repetitively.

In view of the above described object, according to the present invention, there is provided a crankshaft bearing for an internal combustion engine shown below.

A crankshaft bearing for an internal combustion engine, the crankshaft bearing being used as a cylindrical body with a pair of semi-cylindrical sliding bearings combined with each other, wherein one semicircular thrust bearing or two semicircular thrust bearings is or are attached to at least one of the pair of semi-cylindrical sliding bearings, the one semicircular thrust bearing or the two semicircular thrust bearings being provided along one or both of two axial side edges of the semi-cylindrical sliding bearing, wherein the semicircular thrust bearing has both circumferential end surfaces, and further has an outer periphery and an inner periphery each having an arc shape, an arc diameter of the inner periphery being larger than an outside diameter of the semi-cylindrical sliding bearing, two tabs extending toward an inside in a radial direction being projected at the inner periphery of the semicircular thrust bearing to be separated from each other in the circumferential direction, the two tabs being located at line-symmetrical positions with respect to a straight line in the radial direction dividing a length of the inner periphery into two equal parts, that is, a center line, a corner edge portion of a tab base portion continuing to a main body of the semicircular thrust bearing being located at a side far from each of the circumferential end surfaces, each of the tabs being projected at the inner periphery so that the corner edge portion being present in a range of a circumferential angle of 15° to 55° measured from each of the circumferential end surfaces, wherein at least one of the semi-cylindrical sliding bearing has a reduced-thickness region where a bearing wall thickness is partially thinned at a bearing inner circumferential surface side over an entire circumferential length along the axial side edge provided with the semicircular thrust bearing, two notches being formed in the reduced-thickness region to be separated from each other in the circumferential direction, the two notches being in a relation in which the two notches are engaged with the two tabs of the semicircular thrust bearing, the engagement relation being made such that at a time of a free state before the crankshaft bearing is assembled to the crankshaft, and the pair of semi-cylindrical sliding bearings is restrained by a bearing housing of the crankshaft, an outside diameter of the semi-cylindrical sliding bearing is larger at both circumferential end portions than at a circumferential central portion, whereby one side edge in a width direction of the tab is in a state in which the one side edge in the width direction of the tab interferes with and is engaged with one side edge in a width direction of the notch, and such that in a state in which the pair of semi-cylindrical sliding bearings is assembled into the bearing housing of the crankshaft and restrained, the outside diameter of the semi-cylindrical sliding bearing becomes uniform, the interference and engagement relation is dissolved, and the tab is brought into a free state in the notch, whereby the semicircular thrust bearing can move in an axial direction of the crankshaft, wherein a dimensional relation of the notch and the tab satisfies a relational expression 1: notch circumferential length (width)>tab circumferential length (width), and a relational expression 2: notch axial width (depth)>tab axial width (thickness), and wherein at the inner periphery of the semicircular thrust bearing, two impact load receiving projections are projected besides the two tabs, each of at least the two impact load receiving projections being between each of the two tabs and each of the circumferential end surfaces of the semicircular thrust bearing, the two impact load receiving projections being at line-symmetrical positions with each other with respect to the center line of the semicircular thrust bearing, and a height of the impact load receiving projection being set at a dimension such that a top portion of the impact load receiving projection is not in contact with an outer circumferential surface of the semi-cylindrical sliding bearing in a static state in which the pair of semi-cylindrical sliding bearings is assembled into the bearing housing of the crankshaft and restrained.

Out of the pair of semi-cylindrical sliding bearings, one of the semi-cylindrical sliding bearings may be configured as a semi-cylindrical sliding bearing according to the present invention, and the other may be configured as a semi-cylindrical sliding bearing to which a thrust bearing is not attached. And then, they may be used by being combined into a cylindrical shape.

In a first preferred embodiment of the present invention, the impact load receiving projection is at a retreat position with respect to a thrust load receiving surface of the semicircular thrust bearing.

In a second preferred embodiment of the present invention, the tab and the impact load receiving projection are formed to be in a relation in which the tab and the impact load receiving projection do not continue to each other.

In a third preferred embodiment of the present invention, the tab is deviated in a back surface direction of the semicircular thrust bearing which is at an opposite side from the thrust load receiving surface, with respect to the impact load receiving projection, and at least part of the tab projects past the back surface.

In a fourth preferred embodiment of the present invention, a third tab is projected at the inner periphery of the semicircular thrust bearing besides the two tabs, the third tab being located in a central region of the length of the inner periphery, between the two tabs, and wherein a third notch located between the two notches is formed in the reduced-thickness region of the semi-cylindrical sliding bearing, the third notch being in a relation in which the third notch is engaged with the third tab, and by the engagement relation, circumferential relative rotation of the semicircular thrust bearing with respect to the semi-cylindrical sliding bearing being inhibited.

In a fifth preferred embodiment of the present invention, a first and second gap supporting projections are projected at the inner periphery of the semicircular thrust bearing, the respective first and second gap supporting projections being located at positions respectively exceeding ranges of circumferential angles of 20° at both sides of a central position, when a circumferential angle at the central position dividing the length of the inner periphery of the semicircular thrust bearing into two equal parts is set as zero degrees, and a height of the gap supporting projection being set at a dimension allowing a top portion of the gap supporting projection to be in contact with the outer circumferential surface of the semi-cylindrical sliding bearing in a static state in which the pair of semi-cylindrical sliding bearings is assembled into the bearing housing of the crankshaft and restrained.

(1) In the crankshaft bearing of the present invention, at the inner periphery of the semicircular thrust bearing, at least the two impact load receiving projections are projected besides the two tabs, each of at least the two impact load receiving projections being located between each of the two tabs and each of the circumferential end surfaces of the semicircular thrust bearing, the two impact load receiving projections being at positions line-symmetrical with each other with respect to the center line of the semicircular thrust bearing, and a height of the impact load receiving projection being set at a dimension such that the top portion of the impact load receiving projection is not in contact with the outer circumferential surface of the semi-cylindrical sliding bearing in the static state in which the pair of semi-cylindrical sliding bearings is assembled into the bearing housing of the crankshaft and restrained. Accordingly, when the crankshaft bearing of the present invention is incorporated into the bearing holding hole of the bearing housing which holds the crankshaft bearing, and the pair of semi-cylindrical sliding bearings is elastically deformed repetitively in the horizontal direction with repetitive elastic deformation of the bearing housing by the action of the dynamic load during operation of the internal combustion engine, the outer circumferential surface of the semi-cylindrical sliding bearing is brought into contact with the two impact load receiving projections which are projected at the inner periphery of the semicircular thrust bearing, and elastic deformation of the semi-cylindrical sliding bearing is inhibited. As a result, movement of the tabs of the semicircular thrust bearing inside the notches of the semi-cylindrical sliding bearing is suppressed, and then, repetitive collision of the side edges of the tabs and the side edges of the notches is also suppressed. Thus, deformation and breakage of the tabs and the notches can be effectively prevented.

Each of the two tabs in the present invention is projected at the inner periphery of the semicircular thrust bearing so that a corner edge portion is present in a range of a circumferential angle of 15° to 55° measured from each of the circumferential end surfaces, the corner edge portion of the tab base portion continuing to the main body of the semicircular thrust bearing being located at a side far away from each of the circumferential end surfaces of the semicircular thrust bearing. The reason why the position where the tabs are projected is limited is that if the corner edge portion exceeds the position at the circumferential angle of 55°, the engagement and interference relation of the two tabs and the two notches is insufficient and an integral coupling relation of the semi-cylindrical sliding bearing and the semicircular thrust bearing is not obtained, due to "the shape in which the radius of curvature becomes gradually larger from the circumferential central region toward both the circumferential end surfaces" of the semi-cylindrical sliding bearing in the free state before the crankshaft bearing of the present invention is incorporated into the bearing housing. The reason is also that if the corner edge portion is located in the position at a circumferential angle of less than 15°, it is difficult to provide the two impact load receiving projections at the inner periphery of the semicircular thrust bearing.

(2) The crankshaft bearing according to the first embodiment of the present invention has the configuration that the impact load receiving projection is located at a retreat position with respect to the thrust load receiving surface of the semicircular thrust bearing. In the crankshaft bearing of the present invention, the semicircular thrust bearing and the semi-cylindrical sliding bearing are assembled into the split type bearing housing as an integrally combined single assembly. In the assembled state, the regions of each of the butted end portion of the pair of semi-cylindrical sliding bearings are deviated toward the curvature center, and the pair of semi-cylindrical sliding bearings is deformed in accordance with the shape of the bearing holding hole. However, since the semicircular thrust bearing is located outside the split type bearing housing, it is not deformed at all. Subsequently, the interference/coupling relation of the notches and the tabs is dissolved by the deformation of the semi-cylindrical sliding bearing, and the semicircular thrust bearing becomes slightly movable in the axial direction of the crankshaft with respect to the semi-cylindrical sliding bearing. As a result, at the time of operation of the internal combustion engine, automatic positioning (alignment) is performed, in which the thrust load receiving surface of the semicircular thrust bearing comes to be parallel to the side surface of the crank web which applies an axial load of the crankshaft. Therefore, when the semicircular thrust bearing is inclined with respect to the axis of the semi-cylindrical sliding bearing, accordingly, the outer periphery portion of the thrust load receiving surface of the semicircular thrust bearing being displaced to be away from the sliding surface of the crankshaft, and the inner periphery portion of the thrust load receiving surface being displaced to be close to the sliding surface (side surface of the crank web) of the crankshaft, the impact load receiving projection is brought into contact with the sliding surface of the crankshaft, and the surface of the impact load receiving projection is likely to be worn or broken, if one surface of the impact load receiving projection of the semicircular thrust bearing is flush with the thrust load receiving surface. However, in the crankshaft bearing according to the first embodiment, the impact load receiving projection is constituted to be located at the retreat position with respect to the thrust load receiving surface of the semicircular thrust bearing as described above. Thus, even if the semicircular thrust bearing is inclined as described above, contact of the impact load receiving projection and the sliding surface of the crankshaft can be avoided. Therefore, damage of the impact load receiving projection can be prevented.

(3) The tab and the impact load receiving projection in the crankshaft bearing according to the second embodiment of the present invention are formed to be in a relation in which the tab and the impact load receiving projection do not continue to each other. When the outer circumferential surface of the semi-cylindrical sliding bearing abuts on the impact load receiving projection of the semicircular thrust bearing by the elastic deformation of the semi-cylindrical sliding bearing by the dynamic load of the crankshaft during engine operation, the impact load receiving projection is elastically deformed. Therefore, if the impact load receiving projection and the tab are continued to each other, there arises the fear that the deformation of the impact load receiving projection reaches the tab, the tab is elastically deformed and falls off from the notch of the semi-cylindrical sliding bearing, or the side edge of the tab and the side edge of the notch strongly interfere with each other, which causes deformation and damage of the tab and the notch. However, according to the second embodiment, such a disadvantage can be effectively prevented.

(4) In the crankshaft bearing according to the third embodiment, the tab is deviated in a back surface direction of the semicircular thrust bearing, which is at an opposite side from the thrust load receiving surface, with respect to the impact load receiving projection, and at least part of the tab projects past the back surface. In the case of the configuration like this, the operational effect similar to that in the second embodiment can be obtained.

(5) In the crankshaft bearing according to the fourth embodiment of the present invention, the third tab is projected at the inner periphery of the semicircular thrust bearing besides the two tabs. And, the third tab is located in a central region of the length of the inner periphery, between the two tabs. And, a third notch located between the two notches is formed in the reduced-thickness region of the semi-cylindrical sliding bearing. The third notch is in a relation in which the third notch is engaged with the third tab. By the engagement relation, circumferential relative rotation of the semicircular thrust bearing with respect to the semi-cylindrical sliding bearing is inhibited. By adopting the configuration like this, the possibility of the semicircular thrust bearing rotating together with the sliding surface due to contact relation with the sliding surface of the crankshaft can be eliminated.

(6) In the crankshaft bearing according to the fifth embodiment of the present invention, the first and the second gap supporting projections are projected at the inner periphery of the semicircular thrust bearing besides the two impact load receiving projections. The respective first and second gap supporting projections are located at positions each respectively exceeding ranges of circumferential angles of 20° at both sides of the central position, when a circumferential angle at the central position which divides the length of the inner periphery of the semicircular thrust bearing into two equal parts is set as zero degrees. The first and the second gap supporting projections each has a dimension which allows the tip end thereof to be in contact with the outer circumferential surface of the semi-cylindrical sliding bearing in the static state in which the crankshaft bearing of the present invention is assembled into the bearing holding hole of the bearing housing which holds the crankshaft bearing and restrained, and are provided to keep the gap (gap in the perpendicular direction with respect to the bearing center line) between the outer circumferential surface of the semi-cylindrical sliding bearing and the inner periphery of the semicircular thrust bearing. If the outer circumferential surface of the semi-cylindrical sliding bearing and the inner periphery of the semicircular thrust bearing are in contact with each other, the semicircular thrust bearing is restrained in the axial direction due to the interference relation of both of them, and automatic positioning (alignment) is not performed, which makes the thrust load receiving surface of the semicircular thrust bearing parallel to the side surface of the crank web which gives the axial load of the crankshaft. Further, the reason why the first and the second gap supporting projections are provided at the positions exceeding the ranges of the circumferential angles of 20° at both sides of the central position is as follows.

The perpendicular direction to the straight line in the radial direction which divides the circumferential length of the semi-cylindrical sliding bearing into two equal parts, that is, the center line, is the direction in which the dynamic load of the crankshaft directly works at the time of operation of the internal combustion engine. When the first and the second gap supporting projections are provided in the ranges of the circumferential angles of 20° at both sides of the central position, the tip ends of the first and the second gap supporting projections and the outer circumferential surface of the semi-cylindrical sliding bearing are repetitively brought into contact with each other strongly, and both the gap supporting projections are likely to be deformed or broken.

For the same reason as that of the above described item (3), continuing the first and the second gap supporting projections to the third tab is desired to be avoided. Further, when the first and the second gap support projections are not provided, care should be taken because unreasonable force acts on the third tab. Further, when only the first and the second gap supporting projections are provided, and the first and the second impact load receiving projections are not provided, the side edges of the tabs of the semicircular thrust bearings and the side edges of the notches of the semi-cylindrical sliding bearings repetitively collide with one another when the pair of semi-cylindrical sliding bearings which is held in the bearing holding hole of the bearing housing is elastically deformed in the horizontal direction with elastic deformation of the bearing housing during internal combustion operation, and the outer circumferential surfaces of the pair of semi-cylindrical sliding bearings are repetitively displaced. Therefore, deformation and breakage of the tabs and the notches cannot be prevented.

DETAILED DESCRIPTION OF THE INVENTION

Hereinafter, an embodiment of the present invention will be described with reference to the accompanying drawings.

Figure 1:
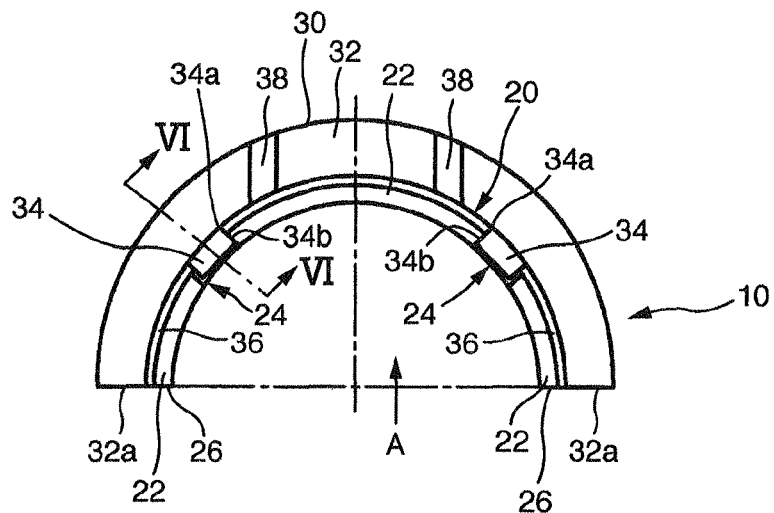
FIG. 1 is a side view of a semicircular thrust bearing and a semi-cylindrical sliding bearing according to one embodiment of the present invention, which are in a combined relation with each other.
Figure 2:
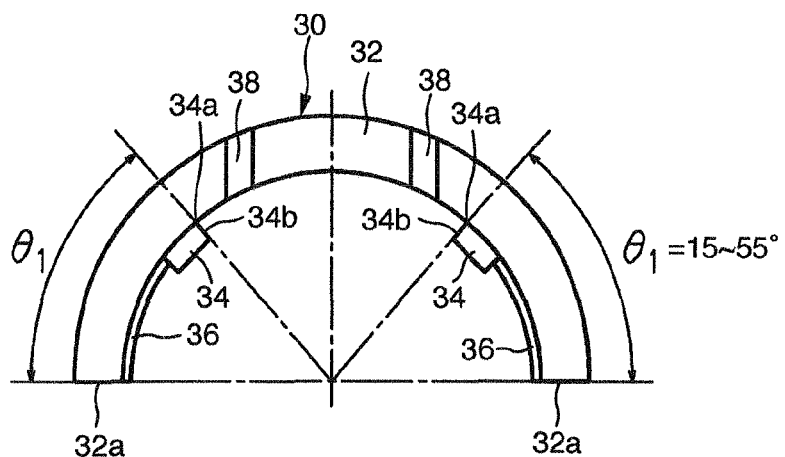
FIG. 2 is a side view of the semicircular thrust bearing shown in FIG. 1.
Figure 3:
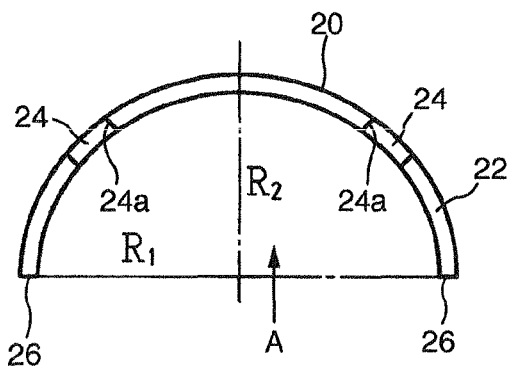
FIG. 3 is a side view of the semi-cylindrical sliding bearing shown in FIG. 1.
Figure 4:
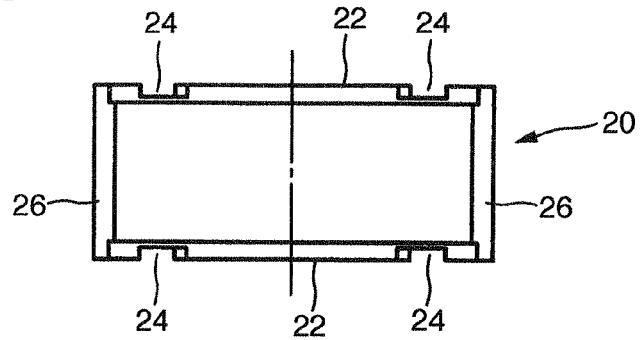
FIG. 4 is a view viewed along an arrow in an A-direction of the semi-cylindrical sliding bearing shown in FIGS. 1 and 3.

FIG. 1 shows a half body 10 of a crankshaft bearing for an internal combustion engine according to one embodiment of the present invention. The half body 10 is constituted of a semi-cylindrical sliding bearing 20 and a semicircular thrust bearing 30 which are in a combination relation with each other. The semicircular thrust bearings 30 are provided along both end surfaces 22 (that is, both ends in an axial direction or a width direction) of the semi-cylindrical sliding bearing 20 to be formed into a pair of flange shapes (however, in the drawings, only one of the semicircular thrust bearings 30 is shown). In the present embodiment, the configuration is adopted in which a pair of semicircular thrust bearings 30 is attached to the semi-cylindrical sliding bearing 20. However, a single semicircular thrust bearing may be attached to a semi-cylindrical sliding bearing.

Figure 5:
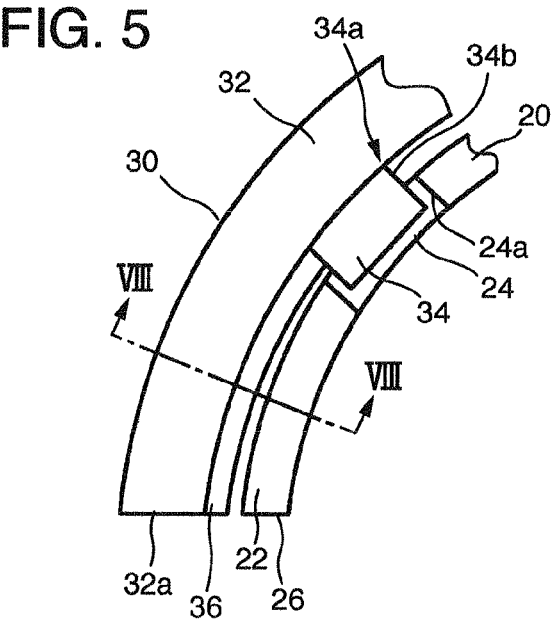
FIG. 5 is a view showing an essential part of a bearing in a state in which the bearing of the present invention is incorporated into a bearing housing and the semi-cylindrical sliding bearing is restrained.

The semicircular thrust bearing 30 is constituted of a thrust bearing main body 32, two tabs 34 projected at an inner periphery of the thrust bearing main body 32, and two impact load receiving projections 36. A corner edge portion 34a of a tab base portion continuing to the semicircular thrust bearing main body 32 is located at a side far away from each of circumferential end surfaces of the semicircular thrust bearing. Each of the two tabs 34 is projected at the inner periphery of the thrust bearing main body 32 so that the corner edge portion 34a is present in a range of a circumferential angle θ1=15° to 55° which is measured from each of the aforementioned circumferential end surfaces 32a. The two impact load receiving projections 36 projected at the inner periphery of the thrust bearing main body 32 are extended from the respective circumferential end surfaces of the thrust bearing main body 32 to positions adjacent to the tabs 34. Heights of the two impact load receiving projections 36 are smaller than the height of the tab 34. And, a tip end of each of the impact load receiving projections 36 is separated from an outer circumferential surface of the semi-cylindrical sliding bearing 20 except for the time when a dynamic load of the crankshaft acts on the bearing in an operating condition of the engine (FIG. 5).

Two notches 24 are formed at each of both end surfaces 22 of the semi-cylindrical sliding bearing 20. The two notches 24 and the two tabs 34 are configured so that the two notches 24 and the two tabs 34 are engaged with one another (FIG. 1). The semi-cylindrical sliding bearing 20 has a reduced-thickness region 20a where a bearing wall thickness is partially reduced at a bearing inner circumferential surface side over an entire circumferential length along the axial end surface 22 provided with the semicircular thrust bearing 30. In the reduced thickness region 20a, the two notches 24 are formed to be separated from each other in the circumferential direction.

FIG. 1 is shown in a free state before the bearing half body 10 is assembled into a bearing housing H, and a side edge 34b of the tab 34 interferes with and is in contact with a side edge 24a of the notch 24. The interference and contact relation is obtained by the noncircular shape in the free state of the semi-cylindrical sliding bearing 20. FIG. 5 is shown in a restrained state in which the bearing half body 10 is assembled into the bearing housing H, and the side edge 34b of the tab 34 is separated from the side edge 24a of the notch 24.

Operation of the Bearing Half Body 10

Figure 6:
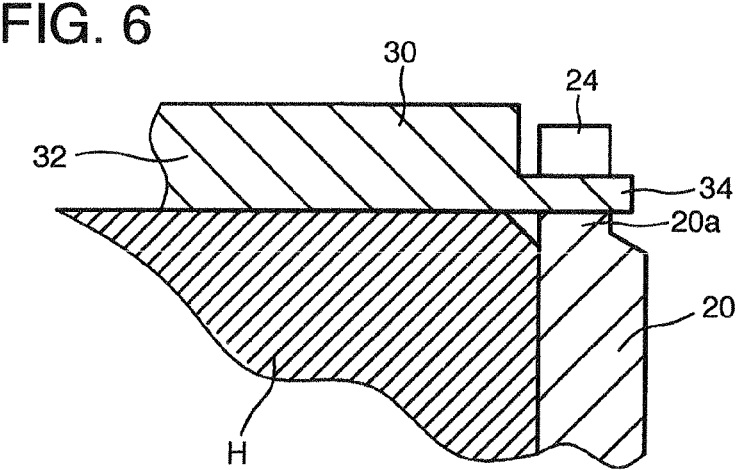
FIG. 6 is a cut view taken along a VI-VI line in FIG. 1.

The bearing half body 10 shown in FIG. 1 can be assembled into the split type bearing housing H as a single assembly, since the semi-cylindrical sliding bearing 20 and the semicircular thrust bearing 30 are integrally combined by the side edges 34b of the tabs 34 and the side edges 24a of the notches 24 which are interfering and brought into contact with one another. When a pair of semi-cylindrical sliding bearings 20 which is combined to form a substantially elliptical shape is incorporated into the split type bearing housing H, the pair of semi-cylindrical sliding bearings 20 is restrained by a circular bearing holding hole of the split type bearing housing H. And then, the pair of semi-cylindrical sliding bearings 20 is force-fully deformed into a circular shape from the initial shape (substantially elliptical shape) of the pair of semi-cylindrical sliding bearings 20. As a result, interference and contact relation of the tabs 34 and the notches 24 is dissolved, and the side edges 34b of the tabs 34 separate from the side edges 24a of the notches 24 (FIG. 5). When the bearing half body 10 is incorporated into the split type bearing housing H, the semicircular thrust bearing 30 is not restrained by the split type bearing housing H. This is because the structure is adopted in which the semicircular thrust bearing 30 is along the side surface of the split type bearing housing H, the reduced-thickness region 20a of the semi-cylindrical sliding bearing 20 projecting outside the split type bearing housing H, and the tabs 34 of the semicircular thrust bearing 30 being engaged in the notches 24 formed in the reduced-thickness region 20a, as shown in FIG. 6.

Figure 8:
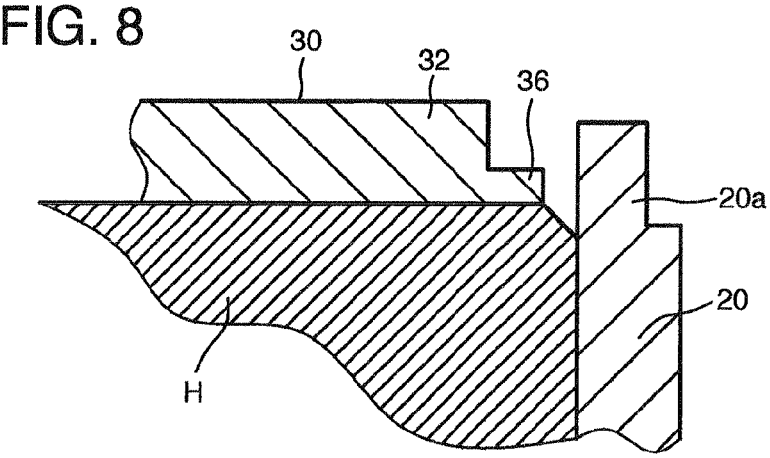
FIG. 8 is a cut view taken along a VIII-VIII line in FIG. 5.

In the aforementioned state in which the bearing half body 10 is incorporated into the split type bearing housing H, the semicircular thrust bearing 30 is slightly movable in the axial direction of the crankshaft with respect to the semi-cylindrical sliding bearing 20. As a result, at the time of operation of the internal combustion engine, an automatic positioning (alignment) is performed, which makes the thrust load receiving surface (surface having a lubricating oil groove 38) of the semicircular thrust bearing 30 become parallel to a side surface of a crank web which gives a load in the axial direction of the crankshaft. Further, the impact load receiving projection 36 of the semicircular thrust bearing 30 is separated from the outer circumferential surface of the semi-cylindrical sliding bearing 20 at a small gap therebetween (see FIGS. 5 and 8).

Figure 7:
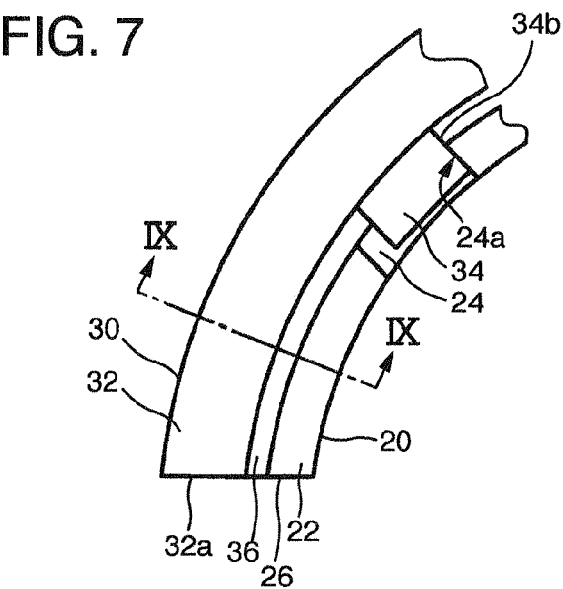
FIG. 7 is a view which shows a state in which at a time of operation of an engine, the semi-cylindrical sliding bearing is elastically deformed, and an outer circumferential surface of the semi-cylindrical sliding bearing is in contact with a semicircular thrust bearing impact load receiving projection, and corresponds to FIG. 5.
Figure 9:
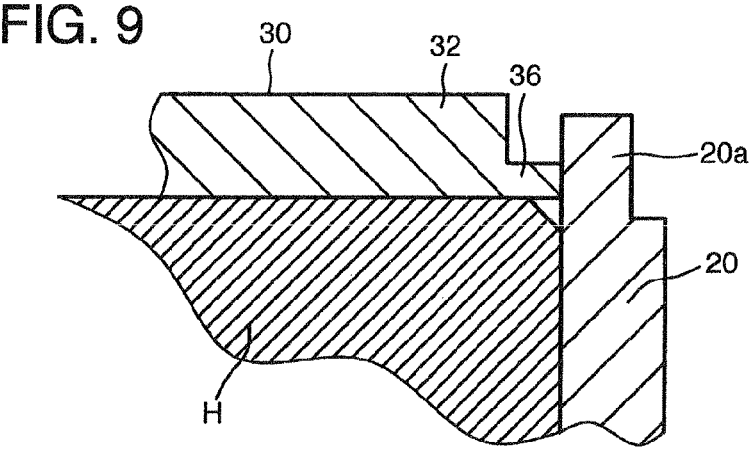
FIG. 9 is a cut view taken along an IX-IX line in FIG. 7.

At the time of engine operation, the split type bearing housing H is elastically deformed repetitively by receiving the dynamic load of the crankshaft, and the pair of semi-cylindrical sliding bearings 20 also repeats elastic deformation of extension and contraction of the diameter in a direction along butted end surfaces 26 thereof (more specifically, the horizontal direction). When the pair of semi-cylindrical sliding bearings 20 extends in diameter in the horizontal direction, the outer circumferential surface thereof abuts on a pair of the impact load receiving projections 36 of the semicircular thrust bearing 30 (see FIGS. 7 and 9), and excessive extension of the diameter of the semi-cylindrical sliding bearing 20 is prevented. Therefore, the disadvantage of the conventional bearing that the tab 34 of the semicircular thrust bearing 30 collides in contact with the side edge 24a of the notch 24 at the side edge 34b can be successfully suppressed.

Figure 10:
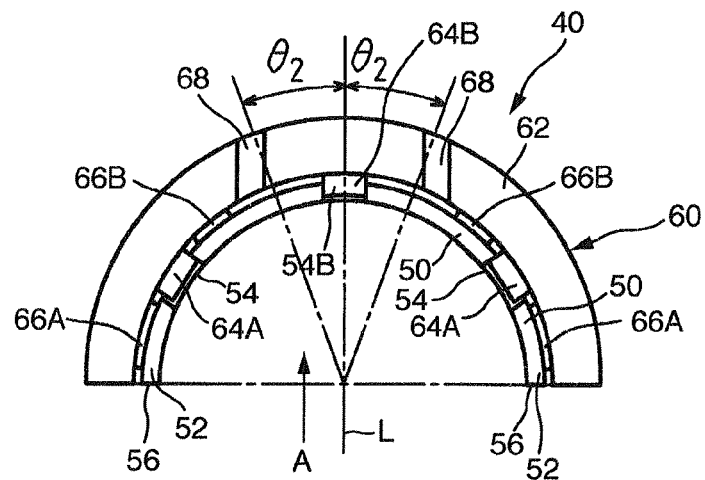
FIG. 10 is a side view of a semicircular thrust bearing and a semi-cylindrical sliding bearing according to another embodiment of the present invention, which are in a combined relation with each other.

FIG. 10 shows a half body 40 of a crankshaft bearing for an internal combustion engine according to another embodiment of the present invention. The half body 40 is constituted of a semi-cylindrical sliding bearing 50 and a semicircular thrust bearing 60 which are in a combination relation with each other. The semicircular thrust bearings 60 are provided to form a pair of flange shapes along both end surfaces 52 (more specifically, both ends in an axial direction or a width direction) of the semi-cylindrical sliding bearing 50.

Figure 11:
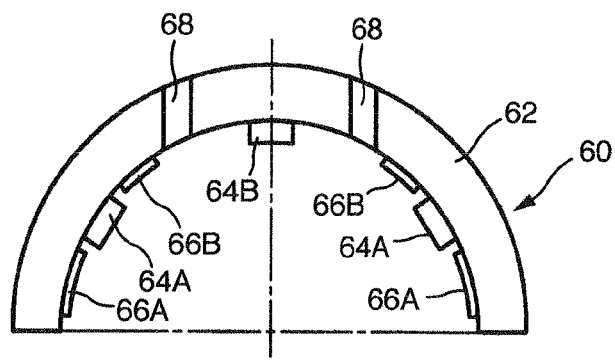
FIG. 11 is a side view of the semicircular thrust bearing shown in FIG. 10.
Figure 12:
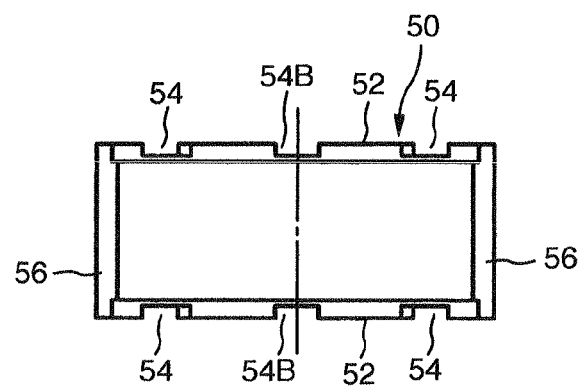
FIG. 12 is a view viewed along an arrow in an A-direction of the semi-cylindrical sliding bearing shown in FIG. 10.
Figure 13:
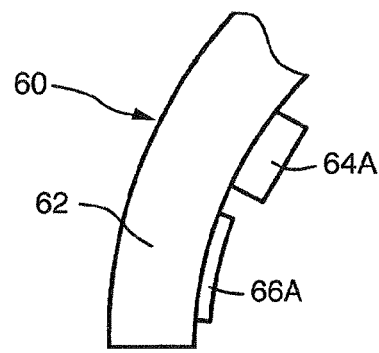
FIG. 13 is an enlarged view of an essential part of FIG. 11.

The semicircular thrust bearing 60 is constituted of a thrust bearing main body 62, three tabs 64A, 64A and 64B which are projected at an inner periphery of the thrust bearing main body 62, two impact load receiving projections 66A and 66A, and two gap supporting projections 66B and 66B (FIG. 11). Each of the two tabs 64A is projected at the inner periphery of the semicircular thrust bearing main body 62 under the same condition as the two tabs 34 in the aforementioned embodiment.

Three notches 54, 54 and 54B are formed in each of both end surfaces 52 of the semi-cylindrical sliding bearing 50. The three notches 54, 54 and 54B and the three tabs 64A, 64A and 64B are configured so that the three notches and the three tabs are engaged with one another (FIG. 10). The notch 54B is configured to inhibit circumferential relative rotation of the semicircular thrust bearing 60 with respect to the semi-cylindrical sliding bearing 50 by engagement with the tab 64B. By adopting the configuration like this, the possibility of the semicircular thrust bearing 60 rotating together with the sliding surface by the contact relation with the sliding surface of the crankshaft can be eliminated.

Further, the two impact load receiving projections 66A correspond to the two impact load receiving projections 36 in the aforementioned embodiment, but differs from the impact load receiving projections 36 in the aforementioned embodiment in that the two impact load receiving projections 66A are projected at the inner periphery of the semicircular thrust bearing main body 62 from the positions slightly separated from the respective circumferential end surfaces of the thrust bearing main body 62 to the positions slightly separated in the circumferential direction from the tabs 64A (FIGS. 10 and 11). One side edge of the impact load receiving projection does not especially need to correspond to the circumferential end surface of the thrust bearing main body, as is shown in the present embodiment in which the impact load receiving projection 66A extends in the tab 64A direction from the position slightly separated from each of the circumferential end surfaces of the thrust bearing main body 62.

The two gap supporting projections 66B each have such a projection height that tip ends thereof are in contact with the outer circumferential surface of the semi-cylindrical sliding bearing when the bearing is incorporated into the bearing holding hole of the bearing housing which holds the crankshaft bearing, and are projected at the inner periphery of the semicircular thrust bearing main body 62, between each of the tabs 64A and the tab 64B. The two gap supporting projections 66B are located at positions exceeding a range of a circumferential angle θ2=20° respectively at both sides of a center line L when a circumferential angle at the position of a straight line which divides a circumferential length of the semicircular thrust bearing main body 62 into two equal parts and passes through the bearing axis, that is, the center line L is set at zero degrees. And, the respective gap supporting projections 66B are located at positions slightly separated from the respective tabs 64A in the circumferential direction. The reason why the gap supporting projection 66B is provided at the position exceeding the aforementioned range of the circumferential angle θ2=20° is as aforementioned in item (6) of the description.

Figure 14:
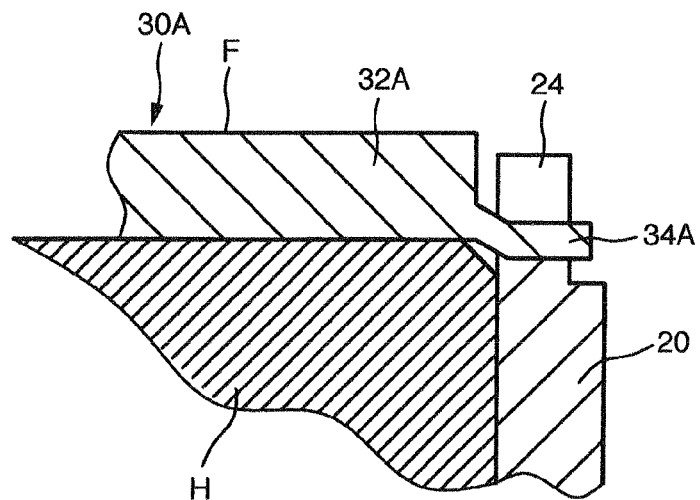
FIG. 14 is a modified embodiment of the semicircular thrust bearing shown in FIG. 6.

Modified Embodiments (1) A semicircular thrust bearing 30A shown in FIG. 14 is a modified embodiment of the semicircular thrust bearing 30 shown in FIG. 6. In FIG. 14, a tab 34A projected at an inner periphery of a thrust bearing main body 32A of the semicircular thrust bearing 30A is extended and deviated inward of the semi-cylindrical sliding bearing 20 (more specifically, a direction to be away from a thrust load receiving surface F of the semicircular thrust bearing 30A, in the axial direction of the semi-cylindrical sliding bearing 20), with respect to "surface in contact with the bearing housing" of the thrust bearing main body 32A. The deviated shape is advantageous to avoid continuation of the impact load receiving projection 36 and the tab 34A.

Figure 15:
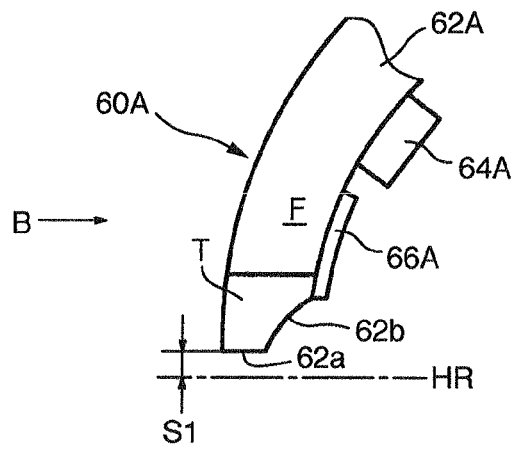
FIG. 15 is a view showing a part of a semicircular thrust bearing as a modified embodiment of the semicircular thrust bearing shown in FIGS. 10 and 11.
Figure 16:
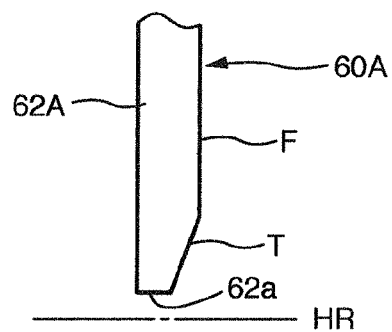
FIG. 16 is a view viewed along an arrow in a B-direction in FIG. 15.

(2) FIGS. 15 and 16 (figure viewed along an arrow in a B-direction in FIG. 15) locally shows only a vicinity of a circumferential end surface of a thrust bearing main body 62A of a semicircular thrust bearing 60A as a modified embodiment of the semicircular thrust bearing 60 shown in FIGS. 10 and 11. In a partial region in a vicinity of a circumferential end surface 62a of the thrust bearing main body 62A, taper (T) is added so that a thickness of the thrust bearing main body 62A becomes gradually smaller from the thrust load receiving surface F toward the circumferential end surface 62a. The circumferential end surface 62a of the thrust bearing main body 62A does not reach a horizontal line HR which passes through butted end surfaces (that is, the circumferential end surfaces) of a pair of semi-cylindrical sliding bearings which is combined into a cylindrical shape. As compared with the semicircular thrust bearings shown in FIGS. 1, 2, 10, and 11, a circumferential length of the thrust bearing main body 62A is short by a length S1 in each of the circumferential end surfaces 62a portions. Further, at a part to which the taper (T) is given in the thrust bearing main body 62A, an inner periphery of the thrust bearing main body 62A which extends from the impact load receiving projection 66A to the circumferential end surface 62a is cut into an arc shape (62b). A curvature of the arc-shaped cut portion (62b) is the same as a curvature of an outside diameter of the thrust bearing main body 62A.

Figure 17:
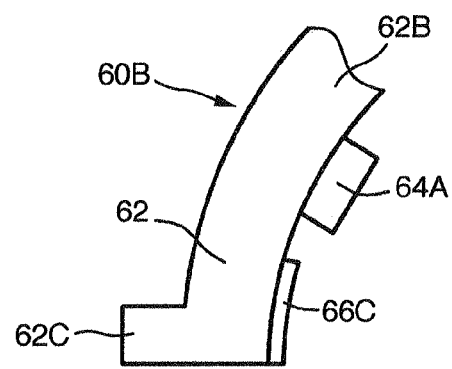
FIG. 17 is a view showing a part of a semicircular thrust bearing as a modified embodiment of the semicircular thrust bearing shown in FIGS. 10 and 11.

(3) FIG. 17 locally shows only a vicinity of a circumferential end surface of a thrust bearing main body 62B of a semicircular thrust bearing 60B as a modified embodiment of the semicircular thrust bearing 60 shown in FIGS. 10 and 11. The feature of the semicircular thrust bearing 60B lies in that an extended portion 62C which extends outward in a radial direction from an outer periphery of the thrust bearing main body 62B is formed in a region in the vicinity of the end surface of the thrust bearing main body 62B. The extended portion 62C is not limited to the illustrated position, and may be formed at an optional position at the outer periphery of the thrust bearing main body 62B. In any case, the role of the extended portion 62C is a positioning and detent functions of the semicircular thrust bearing 60B.

The invention claimed is:

1. A crankshaft bearing for an internal combustion engine, the crankshaft bearing being used as a cylindrical body with a pair of semi-cylindrical sliding bearings combined with each other, wherein one semicircular thrust bearing or two semicircular thrust bearings is or are attached to at least one of the pair of semi-cylindrical sliding bearings, the one semicircular thrust bearing or the two semicircular thrust bearings being provided along one or both of two axial side edges of at least one of the pair of the semi-cylindrical sliding bearings, wherein the semicircular thrust bearing has both circumferential end surfaces, and further has an outer periphery and an inner periphery each having an arc shape, an arc diameter of the inner periphery being larger than an outside diameter of the semi-cylindrical sliding bearing, two tabs extending toward an inside in a radial direction being projected at the inner periphery of the semicircular thrust bearing to be separated from each other in the circumferential direction, the two tabs being located at line-symmetrical positions with respect to a straight center line radially dividing a length of the inner periphery into two equal parts, a corner edge portion of a tab base portion continuing to a main body of the semicircular thrust bearing being located at a side spaced from each of the circumferential end surfaces, each of the tabs being projected at the inner periphery so that the corner edge portion is present in a range of a circumferential angle of 15° to 55° measured from each of the circumferential end surfaces, wherein at least one of the pair of semi-cylindrical sliding bearings has a reduced-thickness region where a bearing wall thickness is partially thinned at a bearing inner circumferential surface side over an entire circumferential length along the axial side edge provided with the semicircular thrust bearing, two notches being formed in the reduced-thickness region to be separated from each other in the circumferential direction, the two notches being in a relation in which the two notches are engaged with the two tabs of the semicircular thrust bearing, the engagement relation being made such that at a time of a free state before the crankshaft bearing is assembled to the crankshaft, and the pair of semi-cylindrical sliding bearings is restrained by a bearing housing of the crankshaft, an outside diameter of the semi-cylindrical sliding bearing is larger at both circumferential end portions than at a circumferential central portion, whereby one side edge in a width direction of the tab is in a state in which the one side edge in the width direction of the tab interferes with and is engaged with one side edge in a width direction of the notch, and such that in a state in which the pair of semi-cylindrical sliding bearings is assembled into the bearing housing of the crankshaft and restrained, the outside diameter of the semi-cylindrical sliding bearing becomes uniform, the interference and engagement relation is dissolved, and the tab is brought into a free state in the notch, whereby the semicircular thrust bearing can move in an axial direction of the crankshaft, wherein a dimensional relation of the notch and the tab satisfies a relational expression 1: notch circumferential length (width) >tab circumferential length (width), and a relational expression 2: notch axial width (depth) >tab axial width (thickness), and wherein at the inner periphery of the semicircular thrust bearing, two impact load receiving projections are projected besides the two tabs, each of at least the two impact load receiving projections being between each of the two tabs and each of the circumferential end surfaces of the semicircular thrust bearing, the two impact load receiving projections being at line-symmetrical positions with each other with respect to the center line of the semicircular thrust bearing, and a height of the impact load receiving projection being set at a dimension such that a top portion of the impact load receiving projection is not in contact with an outer circumferential surface of the semi-cylindrical sliding bearing in a static state in which the pair of semi-cylindrical sliding bearings is assembled into the bearing housing of the crankshaft and restrained.

2. The crankshaft bearing for an internal combustion engine according to claim 1,
wherein the impact load receiving projection is at a retreat position with respect to a thrust load receiving surface of the semicircular thrust bearing.

3. The crankshaft bearing for an internal combustion engine according to claim 1,
wherein the tab and the impact load receiving projection are formed to be in a relation in which the tab and the impact load receiving projection do not continue to each other.

4. The crankshaft bearing for an internal combustion engine according to claim 1,
wherein the tab is deviated in a back surface direction of the semicircular thrust bearing which is at an opposite side from the thrust load receiving surface, with respect to the impact load receiving projection, and at least part of the tab projects past the back surface.

5. The crankshaft bearing for an internal combustion engine according to claim 1,
wherein a third tab is projected at the inner periphery of the semicircular thrust bearing besides the two tabs, the third tab being located in a central region of the length of the inner periphery, between the two tabs, and
wherein a third notch located between the two notches is formed in the reduced-thickness region of the semi-cylindrical sliding bearing, the third notch being in a relation in which the third notch is engaged with the third tab, and by the engagement relation, circumferential relative rotation of the semicircular thrust bearing with respect to the semi-cylindrical sliding bearing being inhibited.

6. The crankshaft bearing for an internal combustion engine according to claim 1,
wherein a first and second gap supporting projections are projected at the inner periphery of the semicircular thrust bearing, the respective first and second gap supporting projections being located at positions respectively exceeding ranges of circumferential angles of 20° at both sides of a central position, when a circumferential angle at the central position dividing the length of the inner periphery of the semicircular thrust bearing into two equal parts is set as zero degrees, and a height of the gap supporting projection being set at a dimension allowing a top portion of the gap supporting projection to be in contact with the outer circumferential surface of the semi-cylindrical sliding bearing in a static state in which the pair of semi-cylindrical sliding bearings is assembled into the bearing housing of the crankshaft and restrained.

* * * * *